3,435,096
METHOD OF MAKING GRAFT POLYMERS OF VINYL MONOMERS ONTO ETHYLENE/PROPYLENE TERPOLYMER IN A LATEX
Frank J. Limbert and Charles F. Paddock, Wayne, N.J., assignors to United States Rubber Company, New York, N.Y., a corporation of New Jersey
No Drawing. Filed Feb. 15, 1965, Ser. No. 432,866
Int. Cl. C08f 15/40
U.S. Cl. 260—878          18 Claims

ABSTRACT OF THE DISCLOSURE

Graft polymers of unsaturated monomers such as styrene and acrylonitrile onto an ethylene/propylene polymer backbone are prepared by first grafting a polyfunctional monomer having two or more ethylenically unsaturated double bonds onto an aqueous emulsion of the polymer and subsequently polymerizing with a vinyl monomer having only one ethylenically unsaturated double bond. The preferred catalyst is t-butyl peroxypivalate.

---

This invention relates to an improved method of preparing graft copolymers based on ethylene-propylene copolymers in latex form, in which category we include latices of ethylene-propylene bipolymers and latices of ethylene-propylene-diene terpolymers. In particular it relates to an improved grafting technique used to make the graft polymer portion of a gum plastic comprising a resin portion and a graft polymer portion.

The invention also relates to a novel graft copolymer of bifunctional monomer and resin-forming mono-functional monomeric material on ethylene-propylene copolymer.

It has previously been known to graft copolymerize monofunctional (i.e., monoethylenically unsaturated) resin-forming monomers, such as styrene and acrylonitrile, onto a previously formed ethylene-propylene copolymer rubber spine. However, the known methods for effecting such graft copolymerization have unfortunately been subject to certain disadvantages. Thus, the grafting efficiency in conventional methods, that is, the proportion of resin-forming monomers which becomes graft polymerized onto the rubber spine, has not always been as high as would be desirable. Furthermore, the graft copolymer otbained, if used to make a gum plastic mixture by blending with separately prepared resin, would not always provide a blend having a desirably high impact strength.

The present invention is based on the unexpected discovery that remarkably high grafting efficiencies can be obtained if there is also graft copolymerized, on the ethylene-propylene copolymer rubber spine in aqueous emulsion form, a small amount of a polyfunctional monomer, that is, a monomer containing two or more ethylenic double bonds. The use of such a bifunctional monomer or a monomer of higher functionality in accordance with the invention, not only enables a high proportion of monofunctional resin-forming monomers to become grafted to the rubbery spine, but the resulting graft copolymer is remarkable for its ability to yield a gum plastic blend having high impact strength when the graft copolymer is mixed with separately prepared resin.

The graft copolymerization process of the invention is, as indicated, carried out in aqueous emulsion. The process is preferably carried out in two steps, that is, the polyfunctional monomeric material is preferably first graft copolymerized on the ethylene-propylene copolymer rubber spine in latex form in a first step, followed by a second step in which the monofunctional resin-forming monomeric material is graft copolymerized on the latex. Less preferably, the process may be carried out in a single step in which the monofunctional resin-forming monothe monofunctional monomers onto the spine polymer in latex form.

In the practice of this invention the desired monomer or monomers and an appropriate radical source are added to a latex (i.e., a aqueous dispersion) of the rubbery copolymer. The dispersion is then heated in order to polymerize the monomer(s). The grafted material may be isolated in the usual manner by coagulation, and if desired mixed with additional resin to produce a gum plastic with a desired resin to rubber ratio. If desired, the latex of the grafted material may be blended with a latex of the additional resin, and the two polymers may be co-precipitated to provide the desired blend.

The rubber spine used in the graft polymerization is conventionally prepared in solution in an organic solvent. This solution, or a solution made by dissolving the solid rubber spine in an organic solvent for this purpose, must first be converted into a latex for use in the grafting process of the invention. Any suitable conventional method for converting the rubber solution (cement) into an aqueous dispersion may be used, such as that described in British Patent No. 893,066. Preparation of latex from the cement typically involves emulsifying the cement in water, stripping off the solvent. The resulting dispersion may be concentrated and creamed by conventional procedures to produce a latex having a convenient solids content.

It will be understood that the rubber spine in the latex used in the graft polymerization results from the copolymerization of a monomer mixture comprising two or more alpha-monoolefins; preferably a minor proportion of diolefin is also present in the monomer mixture. If a diolefin is used, the amount should be so limited that the rubbery copolymer has an iodine number not greater than about 20; this will generally correspond to not more than about 10% by weight of diolefin monomer units in the copolymer.

The alpha-monoolefins used in making the rubbery copolymer are those having the formula $CH_2=CHR$, in which R may be hydrogen atom or a saturated alkyl radical, such as methyl, ethyl, n-propyl, isopropyl, etc. Preferred rubbery copolymers are those in which the alpha-monoolefins used are ethylene and propylene, the weight ratio of ethylene monomer units to propylene monomer units in the copolymer being from 20/80 to 80/20, preferably between 35/65 and 65/35. The preferred copolymers further contain from 2 to 10% by weight of a diolefin.

Diolefins suitable for use in making the rubbery copolymer are nonconjugated straight-chain or cyclic diene hydrocarbons which are copolymerizable with the alpha-monoolefins. Examples of suitable diolefins are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like; diolefins in which only one double bond is terminal such as 1,4-hexadiene, 1,9-octadecadiene, 6-methyl-1,5-heptadiene, 7-methyl-1,6-octadiene, 11-ethyl-1,11-tridecadiene and the like. Also suitable are the bridged-ring diene hydrocarbons of a similar nature containing 7 to 10 carbon atoms, especially those containing a methano or an ethano bridge, for example: (a) unsaturated derivatives of bicyclo[2,2,1]heptane containing at least two double bonds, including bicyclo[2,2,1]hepta-2,5-diene; dicyclopentadiene (also named 3a,4,7,7a-tetrahydro-4,7-methanoindene), tricyclopentadiene, and tetracyclopentadiene; (b) unsaturated derivatives of bicyclo[2,2,2]octane containing at least two double bonds, including bicyclo[2,2,2]octa-2,5-diene; (c) unsaturated derivatives of bicyclo[3,2,1]octane containing at least two double bonds; (d) unsaturated derivatives of bicyclo[3,3,1]nonane containing at least two double bonds; (e) unsaturated derivatives of bicyclo[3,2,2]nonane containing at least two double bonds, and the like. Dicyclopentadiene, 1,4-hexadiene, and methylene norbornylene are preferred.

Methods for making these rubbery copolymers are well known, and need not be described here (see e.g., U.S. Patents 3,000,866, 3,000,867, 2,993,480).

As indicated, an important aspect of the invention is directed to a grafting process in which the rubbery spine polymer is reacted with a polyfunctional (bifunctional or higher) substance; usually these are polymerizable monomers, referred to as cross-linking monomers or gelling monomers, containing two or more ethylenic-type double bonds, especially vinyl bonds. Examples of such cross-linking monomers include divinylbenzene, tetramethylene diacrylate, glyceryl triacrylate, ethylene glycol dimethylacrylate, 1,2,4 - trivinylcyclohexane, tetraallyloxyethane, and the like. Such treatment is believed to result in graft copolymerization of the polyfunctional monomer onto the rubbery base polymer and is accompanied by a gelling or cross-linking of the rubbery base polymer. The treatment surprisingly leads to remarkably higher grafting efficiencies, that is, more of the resin-forming monomers become copolymerized with the spine, and to gum plastics of higher impact strength (when the graft copolymer is blended with further resin).

Preferably such treatment or graft copolymerization with a cross-linking monomer is carried out as a separate step before the grafting with the resin-forming monomers. Such a two-step process ordinarily gives the most reproducible results, but, less preferably, the process may also be carried out in one step (see Example 11, below), that is, the reaction with the gelling monomer may be carried out simultaneously with the grafting of the resin-forming monomers.

Remarkably small amounts of cross-linking monomer (e.g., 0.01 to 0.5 part per 100 parts by weight of the spine rubber) are sufficient to produce appreciable gelling of the spine rubber, although larger amounts (1 or 2 parts) may also be used if desired. The gelling is brought about by the action of a free radical polymerization catalyst or initiator of the kind conventionally used for aqueous emulsion polymerization. Such free radical generating agents include, as is well known, the various organic and inorganic peroxides, hydroperoxides, per-salts, azo compounds, and the like. The emulsion graft copolymerization is carried out at a temperature sufficiently elevated to bring about free radical formation at a reasonable rate; the optimum temperature will generally vary with the particular catalyst as will be understood by those skilled in the art. Temperatures within the range from 30° C. to 95° C. are suitable; usually it is not necessary to use a temperature greater than about 80° C. The graft polymerization mixture is agitated during the process to disperse (emulsify) the polyfunctional monomer throughout the latex.

It is believed that when the mixture of spine rubber latex, polyfunctional copolymerizable monomer, and free radical initiator is subject to conventional aqueous emulsion polymerization conditions, the rubber becomes gelled or cross-linked as evidenced by an increase in insoluble material in the rubber. Most unexpectedly, spine rubber treated in this manner is susceptible to far more efficient grafting, with subsequently added different resin-forming monomers, than spine rubber which has not been gelled as described. For puroposes of this preferred form of the invention the base polymer may be regarded as gelled or cross-linked when it shows an increase in insoluble material in such solvents as benzene and cyclohexane in contrast to the ordinary ungelled spine polymers. However, it should be noted that it is not certain whether the beneficial effect is due to the gelling action of the added polyfunctional substance or to some other mechanism, but the increase in gel does accompany the pretreatment step. If desired, the spine rubber may be gelled by the action of the cross-linking monomer prior to converting it into a latex.

Resin-forming monomers suitable for grafting onto the rubber spine in latex form in accordance with the invention include monoethylenically unsaturated monomers such as styrene, the halo-styrenes (e.g., para-chlorostyrene), alpha-methylstyrene, p-methylstyrene, acrylonitrile, methacrylonitrile, acrylic acid, methacrylic acid, the lower alkyl (1–8 carbon atoms) esters of acrylic and methacrylic acids (e.g., methyl acrylate, methyl methacrylate), vinyl chloride, and many others (alone or in mixtures of two or more). Monomers of particular interest are styrene; vinyl chloride; methyl methacrylate; mixtures of styrene-acrylonitrile, of styrene-methyl methacrylate, of styrene-methacrylic acid; similar mixtures of alpha-methylstyrene; and mixtures of styrene-alpha-methylstyrene.

As indicated, the gratf copolymer is made by polymerizing the resin-forming monomers in the presence of the rubbery ethylene-propylene copolymer in latex form, with the result that a substantial part of the newly-polymerized resin-forming monomer is attached to the rubber molecules in the latex. The graft copolymerization of the resin-forming monomers is brought about by the action of a free radical polymerization catalyst while agitating and heating the emulsified monomers in the latex, in the manner previously described for the grafting of the polyfunctional or gelling monomer.

The final graft copolymer may be defined as comprising (A) a rubbery spine copolymer of at least two alpha-monoolefins (usually ethylene and propylene, with or without a copolymerizable non-conjugated diene such as dicyclopentadiene) having graft copolymerized thereon (B) a copolymerizable monomer having at least two ethylenic double bonds (i.e., the gelling or cross-linking monomer, such as divinylbenzene) and (C) the resin-forming monomeric material. Preferably (B) is grated onto (A) prior to grafting (C), as described.

An outstanding use for graft copolymer made in accordance with the invention is in the preparation of gum plastics, that is, blends of the graft polymer with separately prepared resin. Such gum plastics are disclosed in detail in Belgian Patent 635,024, July 16, 1963, United States Rubber Company. Resins suitable for this purpose include hard, rigid homopolymers and copolymers of olefinic monomers such as styrene, the halo-styrenes (e.g., para-chlorostyrene), alpha-methylstyrene, p-methylstyrene, acrylonitrile, methacrylonitrile, acrylic acid, methacyrlic acid, the lower alkyl (1–8 carbon atoms) esters of acrylic and methacrylic acids (e.g., methyl acrylate, methyl methacrylate), vinyl chloride, and many others. Resins of particular interest are polystyrene; polyvinyl chloride; polymethyl methacrylate; copolymers of styrene-acrylonitrile, of styrene-methyl methacrylate, of styrene-methacrylic acid, similar copolymers of alpha-methylstyrene; and copolymers of styrene-alpha-methylstyrene.

It will be understood that the properties of the graft polymer and the gum plastic blend will vary with the particular resin-forming monomers selected. Thus alpha-methylstyrene may be selected to give higher heat distortion than styrene, acrylates and methacrylates may be selected to give greater transparency, etc.

One method of evaluating the grafting efficiency is to mix the graft polymer with a suitable resin (a resin that is compatible with the graft polymer, normally the resin monomers are the same as those grated onto the rubber spine) and measuring the impact properties. If no grafting occurs during the polymerization the product will be merely a physical blend of the rubber spine and the polymerized monomer or co-monomers. The Izod impact strength of physical blends of either ethylene-propylene bipolymers of ethylene-propylene terpolymers with the resin used in gum plastics are extremely low, approximately 0.2 ft. lbs/in. of notch. The gum plastics made from graft polymers of this invention show increased impact resistance over the physical blends. Another method, illustrated by example, involves extraction of the graft polymer with a solvent for the resin portion. If all the resin is not extracted the unextracted amount must be grafted onto the rubber spine.

The proportion of resin-forming monomer to rubber used in the grafting reaction may vary over quite a wide range, depending upon factors such as the efficiency of grafting (i.e, the proportion of polymerized resin-forming monomer actually attached to the rubber), and the particular resin-graft copolymer system in question. In a good gum plastic the resin and the rubbery component must be miscible to form a uniform, coherent mixture, i.e., the two components must be compatible.

It is desired to emphasize that the advantages of the invention are not obtainable simply by blending the described resin with the ungrafted rubber itself, which in general is not compatible with the resin. While it is not desired to limit the invention to any particular theory of operation, it appears to be possible that the grafting of a portion of the resin onto the rubber renders the rubbery portion more compatible with the resinous portion, so that a more uniform, coherent mixture is obtained. Whatever the explanation, the observed fact is that the present blend of resin with graft copolymer is remarkably superior to an otherwise simliar blend of the resin with the ungrafted rubber. The proportion of resin-forming monomers to rubber used in the graft polymerization is such as to confer compatibility. Proportions between 1:4 and 4:1, by weight, are satisfactory.

The present graft copolymerizate is a thermoplastic, unvulcanized material, as disinguished from the vulcanized product of U.S. patent 3,179,715, Notta et al., Apr. 20, 1965. It will be understood that a nonthermoplastic, vulcanized material would not be suitable for blending wtih a resin to make a gum plastic which can be further worked and shaped into useful articles. A vulcanized material has the desired shape imparted to it during the vulcanization and it cannot thereafter be worked and shaped in the manner that thermoplastic, unvulcanized material can be worked and shaped. It will be understood that the amount of bifunctional gelling monomer employed in making the present graft copolymer is so small, and the conditions of the process are such, that the amount of cross-linking which takes place is insufficient to alter the basic thermoplastic nature of the polymer, that is, the polymer does not become substantially fully cross-linked in the sense that an insoluble, nonthermoplastic vulcanizate is fully cross-linked.

The following examples, in which all quantities are expressed by weight unless otherwise indicated, will serve to illustrate the practice of the invention in more detail.

EXAMPLE 1

This example illustrates the graft copolymerization of resin-forming monomers, acrylonitrile and styrene, onto an unsaturated EPT, ethylene-propylene-dicyclopentadiene (57.8/37.1/5.1 weight ratio) terpolymer rubber, with (Part B) and without (Part A) prior gelling (grafting) on the rubber of a bifunctional monomer, divinylbenzene. The starting terpolymer rubber is converted into a latex in the following manner. One hundred parts of a 6% solution of the EPT polymer in commercial n-hexane is pumped (gear pump, 1 gal./min.) into a Rapisonic homogenizer. Circulating through the homogenizer at ambient temperature is a soap solution consisting of 2 parts of Dresinate 214 (potassium salt of disproportioned rosin acid), 0.5 part of potassium hydroxide and 100 parts of water. The resulting soap-cement dispersion is emulsified in the homogenizer by passing through an orifice at high pressure (200 p.s.i.g.) and impinging on a vibrating stainless steel reed. The emulsion is recirculated twice through the homogenizer to assure uniformity of the final product. The solvent is removed by steam stripping the emulsion to a final temperature of 90° C. with slow agitation. The stripped latex has a solids content of ca. 5%. This latex is then creamed to remove excess soap and to concentrate the latex. Creaming is accomplished by adding 0.5 part of a 1% solution of Superloid (ammonium alginate) and allowing to separate for 72 hours after which the serum is removed. The finished latex has a solids content of 36.8%; the solids content is adjusted to 20% with distilled water.

Part A.—Grafting onto ungelled rubber spine

Two hundred fifty parts of the 20% total solids EPT latex was charged into a glass bottle along with 2.5 parts of t-butyl peroxypivalate, 35 parts of styrene and 15 parts of acrylonitrile. The bottle was purged with nitrogen, sealed and placed in a 50° C. agitated water bath for 72 hours. The bottle was then cooled and the graft polymer was recovered by flocculation with salt and acetic acid. The conversion of monomers was complete. A grafting efficiency test disclosed that 18% of the polymerized resin was attached to the EPT rubber spine as a graft polymer. This test consists of sheeting a 2-gram polymer sample on a mill to about 20-mil thickness, and carrying out a solvent extraction for 16 hours. The method is described in ASTM D–297. If this extraction test is run on physical blends of rubber and resin all the resin is extracted after 16 hours. Any unextracted resin polymer is assumed to be attached to the base spine as a graft polymer.

Part B.—Grafting onto gelled rubber spine

This part was carried out in two steps. In the first step, divinylbenzene was grafted onto the EPT, thus producing a gelled EPT, and in the second step the styrene and acrylonitrile was grafted onto the gelled spine.

Step 1.—The same amount of latex as in Part A was charged into a glass bottle along with 0.25 part of divinylbenzene and 0.5 part of 1-butyl peroxypivalate. The bottle was purged, sealed and placed in the agitated 50° C. water bath for 48 hours. The bottle was removed, cooled and opened. The interaction of the polymer spine and the divinylbenzene is shown by the fact that the polymer now contained 35.7% gel as compared to the original 20.1% gel.

Step 2.—To the bottle were added 35 parts of styrene, 15 parts of acrylonitrile and 2.5 parts of t-butyl peroxypivalate. The bottle was repurged, resealed and returned to the 50° C. bath for 24 hours. The bottle was cooled and the graft polymer recovered by flocculation with salt and acetic acid. The conversion of monomers was complete, and the grafting efficiency was 69%.

It will be apparent that the method of Part B produces a remarkably higher grafting efficiency than the method of Part A, wherein cross-linking monomer was not used.

The foregoing example may be repeated using other catalysts, such as lauroyl peroxide, potassium persulfate, 2,4-dichlorobenzoyl peroxide, benzoyl peroxide, or 2,5-dimethylethylhexyl-2,5-di(peroxybenzoate). Also, other reaction temperatures may be used, such as a temperature of about 94° C. with 2,5-dimethyl-2,5-di(t-butylperoxy)hexane as a catalyst.

EXAMPLE 2

This example illustrates the superiority of the graft copolymer of the invention from the standpoint of its ability to produce, when blended with separately prepared resin, a gum plastic mixture having high impact strength. Three gum plastics are compared in the table below: Blend 2A is based on the graft copolymer prepared as in Part A of Example 1; Blend 2B is based on the graft copolymer of the invention prepared as in Part B of Example 1, and Blend 2C is based on a purely physical mixture of ungrafted EPT and separately prepared resin.

For evaluation of physical properties enough styrene: acrylonitrile (70:30 weight ratio) resin was added to the graft copolymers by blending on a hot mill to give a final weight ratio of 75/25 styrene:acrylonitrile to ethylene: propylene:diene. The 75% styrene-acrylonitrile content consists of both the total grafted and ungrafted resin. For comparison a physical blend was made of the ethylene: propylene:dicyclopentadiene terpolymer and the styrene: acrylonitrile resin, with the same 75:25 resin-to-rubber ratio. In this case there was no graft copolymerization attempted. Impact resistance values, as determined by the notched Izod method, gave the results in the following table. Amounts of ingredients are in parts by weight.

|  | Blends | | |
| --- | --- | --- | --- |
|  | 2A | 2B | 2C |
| Graft Copolymer | ³51.5 | ⁴50.0 | 0 |
| Styrene:Acrylonitrile resin (70:30) | 48.5 | 50.0 | 75 |
| Ethylene:propylene:dicyclopentadiene polymer (51.8/-37.1/5.1) | 0 | 0 | 25 |
| Naugawhite ¹ | 0.25 | 0.25 | 0.25 |
| Polygard ² | 1.5 | 1.5 | 1.5 |
| Impact strength, ft.-lbs./in | 0.7 | 9.5 | 0.27 |

¹ Alkylated bisphenol antioxidant.
² Tri(nonylated phenyl) phosphite antioxidant.
³ Graft polymer of Example 1, Part A, single-step method.
⁴ Graft polymer of Example 1, Part B.

Comparing the impact strengths of Samples 2A and 2B, we see that the process using a divinylbenzene treatment of the rubber spine in accordance with the invention leads to a much higher impact resistance (2B) of 9.5 than the 0.7 valve of the process in which divinylbenzene is not used (2A).

The improvement in impact strength of Sample 2A over 2C we attribute to the copolymerization of the resin-forming monomers with the rubber spine in 2A. Note that in the previous example the same graft copolymer, 2A, had an 18% grafting efficiency value. We thus have two methods of detecting grafting, namely, the extraction test described in Example 1 and the impact strength test on the gum plastic blend.

EXAMPLE 3

This example illustrates the grating of various resin monomers onto an EPR bipolymer spine.

3A.—250 parts of a 20% total solids ethylene:propylene (58:42 weight ratio) bipolymer latex was charged into a glass bottle. 1.0 part of t-butyl peroxypivalate and 0.50 part of divinylbenzene were added. The bottle was purged with nitrogen, sealed and placed in a 70° C. water bath equipped for agitating the contents of the bottle. After 5 hours reaction time the bottle was removed from the bath, cooled and opened. Fifty parts of styrene and 2.5 parts of t-butyl peroxypivalate were added, and the bottle was returned to the 70° C. bath after repurging and resealing. After 4 hours at 70° C. the monomer had been 96% converted to polymer. The graft polymer was recovered from the latex by flocculation. After drying, 49 parts of the graft copolymer was mixed on a hot mill with 51 parts of polystyrene, making the final ratio of resin to rubber 75:25. Antioxidants were added as in Example 2. The impact resistance of this material was 3.8 ft.-lbs./inch.

3B.—The same procedure as in 3A was followed except for the resin monomers. After the first step with divinylbenzene, 15 parts of acrylonitrile and 35 parts of alpha-methyl styrene were added. After 4 hours at 70° C. the monomers were 81% converted to polymer. 45.3 parts of the recovered graft polymer was blended on a hot mill with 54.7 parts of an alpha-methyl styrene:acrylonitrile (69:31) copolymer resin to make the final ratio of resin to rubber 75:25. The impact resistance was 3.7 ft.-lbs./inch.

3C.—The same procedure as in 3A was followed except that 50 parts of methyl methacrylate was substituted for the styrene. After 4 hours at 70° C. the monomer was 68% converted to polymer. Forty-two parts of the dry graft copolymer (recovered from latex by flocculating and drying) was blended on a hot mill with 58 parts of a poly(methyl methacrylate) to make the final ratio of resin to rubber 75:25. The impact resistance was 2.7 ft.-lbs./inch.

EXAMPLE 4

The following experiments demonstrate the grafting of various monomers onto EPT terpolymer spines. The methods used in Example 3 were followed.

|  | Blends | | | |
| --- | --- | --- | --- | --- |
|  | 4A | 4B | 4C | 4D |
| Step 1: | | | | |
| Ethylene:propylene:dicyclopentadiene terpolymer latex (as in Ex. 1), 20% total solids | 250 | 250 | 250 | 250 |
| Divinylbenzene | .25 | .25 | .25 | .25 |
| t-Butyl peroxypivalate | 1.0 | 1.0 | 1.0 | 1.0 |
| Reaction time, hrs | 5 | 5 | 5 | 5 |
| Temperature, °C | 70 | 70 | 70 | 70 |
| Step 2: | | | | |
| Styrene | 50 |  |  | 25 |
| Acrylonitrile |  | 15 |  |  |

|  | Blends | | | |
| --- | --- | --- | --- | --- |
|  | 3A | 3B | 3C | 3D |
| Alpha-methyl styrene |  | 35 |  |  |
| Methyl methacrylate |  |  | 50 | 25 |
| t-Butyl peroxypivalate | 2.5 | 2.5 | 2.5 | 2.5 |
| Reaction time, hrs | 4 | 4 | 4 | 4 |
| Temperature, °C | 70 | 70 | 70 | 70 |
| Percent Conversion | 100 | 92 | 100 | 100 |
| Polymer Evaluation: | | | | |
| Graft polymer | 51.0 | 48.0 | 52.0 | 52.0 |
| Polystyrene | 49.0 |  |  |  |
| Alpha-methylstyrene:acrylonitrile copolymer (69:31) |  | 52.0 |  |  |
| Poly(methyl methacrylate) |  |  | 48.0 |  |
| Styrene:methyl methacrylate copolymer |  |  |  | 48.0 |
| Naugawhite | .25 | .25 | .25 | .25 |
| Polygard | 1.5 | 1.5 | 1.5 | 1.5 |
| Resin/Rubber | 75/25 | 75/25 | 75/25 | 75/25 |
| Impact resistance (notched Izod, ft.-lbs./in) | 3.0 | 2.2 | 2.9 | 2.9 |

EXAMPLE 5

This example illustrates the use of tetramethylene diacrylate, glyceryl triacrylate, ethylene glycol dimethacrylate, 1,2,4-trivinylcyclohexane, and tetraallyloxyethene as cross-linking agents for the first step gelation in place of the divinylbenzene.

|  | Blends | | | | |
| --- | --- | --- | --- | --- | --- |
|  | 5A | 5B | 5C | 5D | 5E |
| Step 1: | | | | | |
| Ethylene:propylene:dicyclopentadiene terpolymer latex (as in Ex. 1) | 250 | 250 | 250 | 250 | 240 |
| Percent Total Solids | 20 | 20 | 20 | 20 | 16.7 |
| Tetramethylene diacrylate | 0.25 | | | | |
| Glyceryl triacrylate | | 0.25 | | | |
| Ethylene glycol dimethacrylate | | | 0.25 | | |
| 1,2,4-trivinylcyclohexane | | | | 0.25 | |
| Tetraallyloxyethane | | | | | 0.2 |
| t-Butyl peroxypivalate | 1.0 | 1.0 | 1.0 | 0.5 | 0.4 |
| Reaction time, hrs | 48 | 48 | 48 | 5 | 5 |
| Temperature, °C | 50 | 50 | 50 | 70 | 70 |
| Step 2: | | | | | |
| Styrene | 35 | 35 | 35 | 35 | 42 |
| Acrylonitrile | 15 | 15 | 15 | 15 | 18 |
| t-Butyl peroxypivalate | 2.5 | 2.5 | 2.5 | 1.0 | 1.0 |
| Reaction time, hrs | 24 | 24 | 24 | 2 | 3 |
| Temperature, °C | 50 | 50 | 50 | 70 | 70 |
| Percent Conversion | 100 | 100 | 100 | 100 | 99 |
| Polymer Evaluation: | | | | | |
| Graft copolymer | 52.0 | 51.0 | 49.0 | 52.0 | 62.5 |
| Styrene:acrylonitrile (70:30) resin | 48.0 | 49.0 | 51.0 | 48.0 | 37.5 |
| Naugawhite | 0.25 | 0.25 | 0.25 | 0.25 | 0.25 |
| Polygard | 1.5 | 1.5 | 1.5 | 1.5 | 1.5 |
| Resin/rubber | 75/25 | 75/25 | 75/25 | 75/25 | 75/25 |
| Impact resistance (notched Izod), ft-lbs-inch | 2.3 | 7.4 | 2.4 | 1.0 | 9.7 |

EXAMPLE 6

This example illustrates variations in the ratio of resin monomer to rubber in the graft copolymerization on ethylene:propylene bipolymer spines. The bipolymer has a 58:42 weight ratio of ethylene:propylene. In Examples 6C, 6D, and 6E, additional emulsifier (Dresinate 214) is added as the amount of resin monomer increases. The EPR is tabulated as polymer weight. The latex already contains enough emulsifier for the EPR.

|  | Blends | | | | |
| --- | --- | --- | --- | --- | --- |
|  | 6A | 6B | 6C | 6D | 6E |
| Step 1: | | | | | |
| Latex, EPR | 75 | 60 | 50 | 40 | 25 |
| Latex, Water | 200 | 200 | 200 | 200 | 200 |
| Dresinate 214 [1] | | | 0.5 | 1.0 | 1.5 |
| Divinylbenzene | 0.75 | 0.6 | 0.5 | 0.4 | 0.25 |
| t-Butyl peroxypivalate | 1.5 | 1.2 | 1.0 | 0.8 | 0.5 |
| Reaction time, hrs | 5 | 5 | 5 | 5 | 5 |
| Temperature, °C | 70 | 70 | 70 | 70 | 70 |
| Step 2: | | | | | |
| Styrene | 17.5 | 28.0 | 35.0 | 42.0 | 52.5 |
| Acrylonitrile | 7.5 | 12.0 | 15.0 | 18.0 | 22.5 |
| t-Butyl peroxypivalate | 2.5 | 2.5 | 2.5 | 2.5 | 2.5 |
| Reaction time, hrs | 4 | 4 | 4 | 4 | 4 |
| Temperature, °C | 70 | 70 | 70 | 70 | 70 |
| Percent Conversion | 100 | 100 | 100 | 100 | 100 |
| Polymer Evaluation: | | | | | |
| Graft copolymer | 34.0 | 43.5 | 51.5 | 65.0 | 100.0 |
| Styrene:acrylonitrile (70:30) resin | 66.0 | 56.5 | 58.5 | 35.0 |  |
| Naugawhite | 0.25 | 0.25 | 0.25 | 0.25 | 0.25 |
| Polygard | 1.5 | 1.5 | 1.5 | 1.5 | 1.5 |
| Resin/rubber | 75/25 | 75/25 | 75/25 | 75/25 | 75/25 |
| Impact resistance (notched Izod), ft.-lbs./in | 1.5 | 7.8 | 11.4 | 11.5 | 8.1 |

[1] Potassium salt of disproportionated rosin acid.

EXAMPLE 7

Illustrates the same point as Example 6 except for the use of EPT terpolymer instead of EPR bipolymer. The polymer is an ethylene:propylene:dicyclopentadiene terpolymer with a 57.8/37.1/5.1 ratio.

|  | Blends | | | | |
| --- | --- | --- | --- | --- | --- |
|  | 7A | 7B | 7C | 7D | 7E |
| Step 1: | | | | | |
| EPRD | 75 | 60 | 50 | 40 | 25 |
| Water | 200 | 200 | 200 | 200 | 200 |
| Dresinate 214 | | | 0.5 | 1.0 | 1.5 |
| Divinylbenzene | .375 | .30 | .25 | .20 | .125 |
| t-butyl peroxypivalate | .75 | .60 | .50 | .40 | .25 |
| Reaction Time, hrs | 3 | 3 | 3 | 3 | 3 |
| Temperature, °C | 70 | 70 | 70 | 70 | 70 |
| Step 2: | | | | | |
| Styrene | 17.5 | 28.0 | 35.0 | 42.0 | 52.5 |
| Acrylonitrile | 7.5 | 12.0 | 1.50 | 18.0 | 22.5 |
| t-Butyl peroxypivalate | 1.0 | 1.0 | 1.0 | 1.0 | 1.0 |
| Reaction time, hrs | 4 | 4 | 4 | 4 | 4 |
| Temperature, °C | 70 | 70 | 70 | 70 | 70 |
| Percent conversion | 100 | 100 | 100 | 100 | 100 |
| Polymer Evaluation: | | | | | |
| Graft polymer | 35.0 | 43.0 | 52.0 | 65.0 | 100.0 |
| Styrene:acrylonitrile (70:30) resin | 65.0 | 57.0 | 48.0 | 35.0 |  |
| Naugawhite | 0.25 | 0.25 | 0.25 | 0.25 | 0.25 |
| Polygard | 1.5 | 1.5 | 1.5 | 1.5 | 1.5 |
| Resin/rubber | 75/25 | 75/25 | 75/25 | 75/25 | 75/25 |
| Impact resistance (notched Izod), foot-lbs./in. | 0.6 | .7 | 5.1 | 9.7 | 6.1 |

Increasing the reaction time for the first step gelation of the polymer spine from three to five hours resulted in a slight increase in the impact resistance.

EXAMPLE 8

Grafting is accomplished with ethylene:propylene:1,4-hexadiene polymer and ethylene:propylene:methylene norbornylene. The same methods of preparation and evaluation as in Example 1 are followed. Examples 8B and 8C demonstrate the two step procedures.

|  | Blends | | |
| --- | --- | --- | --- |
|  | 8A | 8B | 8C |
| 1,4-hexadiene terpolymer latex, 20% solids | 250 | 250 |  |
| Methylene norbornylene terpolymer latex, 20% solids |  |  | 250 |
| Dresinate 214 | 0.5 | 0.5 |  |
| Divinylbenzene | 0.25 | 0.25 |  |
| t-Butylperoxypivalate | 0.5 | 0.5 |  |
| Reaction time, hrs | 5 | 5 |  |
| Temperature, °C | 70 | 70 |  |
| Styrene | 35 | 35 | 35 |
| Acrylonitrile | 15 | 15 | 15 |
| t-Butylperoxypivalate | 0.5 | 1.0 | 1.0 |
| Reaction time, hrs | 4 | 4 | 4 |
| Temperature, °C | 70 | 70 | 70 |
| Percent conversion | 85 | 86 | 100 |
| Percent grafting efficiency | 17 | 60 | 84 |
| Polymer Evaluation: | | | |
| Graft copolymer | 42.0 | 42.2 | 47.0 |
| Styrene:acrylonitrile (70:30) resin | 58.0 | 57.8 | 53.0 |
| Naugawhite | 0.25 | 0.25 | 0.25 |
| Polygard | 1.5 | 1.5 | 1.5 |
| Resin/rubber | 80/20 | 80/20 | 80/20 |
| Impact resistance (notched Izod), ft.-lbs./inch | 1.2 | 5.7 | 10.0 |

EXAMPLE 9

Illustrates the use of the notched Izod impact test for detecting the presence of graft polymer in EPR systems, similar to Example 2 for EPRD. Example 6C is a typical EPR graft polymer and when mixed with sufficient styrene:acrylonitrile resin (70/30) to make the final ratio 75/25 resin/rubber, its impact resistance is 11.4 ft.-lbs./in. If there were no grafting the material would be a physical blend of resin and rubber. When such a physical blend is made and evaluated, its impact resistance is only 0.25 ft.-lbs. We attribute this large difference in impact resistance to the presence of graft polymer in Example 6C.

EXAMPLE 10

In this example, a nonperoxide catalyst, azobisisobutyronitrile,, is used as the catalyst in both steps.

Step 1

| | |
|---|---|
| Ethylene:propylene:dicyclopentadiene terpolymer latex (59.1:36.3:4.7), 20% solids | 250 |
| Divinyl benzene | 0.5 |
| Azobisisobutyronitrile | 0.5 |
| Reaction time, hrs. | 48 |
| Temperature, °C. | 70 |

Step 2

| | |
|---|---|
| Styrene | 35 |
| Acrylonitrile | 15 |
| Azobisisobutyronitrile | 0.5 |
| Reaction time, hrs. | 24 |
| Temperature, °C. | 70 |
| Percent conversion | 100 |

Polymer evaluation

| | |
|---|---|
| Graft polymer | 51.2 |
| Styrene:acrylonitrile (70:30) resin | 48.8 |
| Naugawhite | 0.25 |
| Polygard | 1.5 |
| Resin/rubber | 75/25 |
| Impact resistance (notched Izod), ft.-lbs./inch | 6.3 |

EXAMPLE 11

This example illustrates the suitability of a one step process in which the gelling agent is added along with the monoethylenically unsaturated resin-forming monomers and catalyst for simultaneous gelling and grafting.

Graft copolymerization

| | |
|---|---|
| Ethylene:propylene:dicyclopentadiene terpolymer (36.5:59.8:3.7), 18.9% total solids | 265 |
| Divinyl benzene | 0.1 |
| t-butylperoxypivalate | 3.0 |
| Styrene | 35 |
| Acrylonitrile | 15 |
| Reaction time, hrs. | 24 |
| Temperature, °C. | 50 |
| Percent conversion | 100 |

Polymer evaluation

| | |
|---|---|
| Graft polymer | 50 |
| Styrene/acrylonitrile resin (70:30) | 50 |
| Naugawhite | 0.25 |
| Polygard | 1.5 |
| Resin/rubber | 75/25 |
| Impact resistance, ft.-lbs./inch | 7.0 |

In a less preferred embodiment of the invention the cross-linking monomer is omitted. It is unexpected that the resin-forming monomers can be grafted copolymerized onto the ethylene-propylene copolymer in latex form, in view of prior teachings such as British Patent 835,578 of Montecatini published May 25, 1960, which discloses products having improved impact strength, obtained by polymerizing styrene on a previously peroxidized (or hydroperoxidized) noncrystallizable alpha-olefin polymer containing 0.1 to 1% oxygen. In a publication by Natta et al., Journal of Polymer Science 34, 685 (1959), especially at page 692, the improved impact strength is attributed to grafting of the styrene onto the peroxidized olefin polymer. The publication indicates that it is necessary to peroxidize the polymer to obtain grafting. The patent likewise teaches that polymerization of styrene in the presence of the oxygen-free olefin polymer by the action of benzoyl peroxide produces not grafting but the homopolymer of styrene, and the resulting composition has an impact strength as low as or lower than polystyrene. In view of these teachings it was most unexpected to find that substantially oxygen-free alpha-olefin copolymer rubber (that is unperoxidized or unhydroperoxidized copolymer [containing substantially no oxygen or only traces of oxygen, and in any case less than 0.1% oxygen, the minimum specified by Montecatini]) could be used directly to form the present graft polymers, as described, in the presence of conventional polymerization catalysts. Even nonperoxide catalysts such as azobisisobutyronitrile successfully initiate grafting in the latex. It was indeed unexpected to find that even benzoyl peroxide (indicated by Montecatini to be inoperative with oxygen-free polymer) produces substantial grafting. Even more unexpected is the remarkably improved impact strength of 2.0 ft. lbs. or more made possible by the use of tertiary butyl peroxypivalate. The graft copolymerization in the latex surprisingly proceeds under non-peroxidizing (and non-hydroperoxidizing) conditions, that is, in the substantial absence of oxygen.

We are aware of British Patent 917,498, Dow Chemical Co., Feb. 6, 1963, wherein ethylene-propylene copolymer is dissolved in styrene and the styrene is polymerized. That patent mentions the use of suspension or mass polymerization techniques and states that emulsifiers may be used, but there is no teaching of graft copolymerization in latex (emulsion polymerization).

If desired, peroxidized or hydroperoxidized ethylene-propylene copolymer in latex form may have a polyfunctional cross-linking monomer and monofunctional resin-forming monomeric material graft copolymerized thereon in accordance with the method of the invention, but it is surprising that prior peroxidation or hydroperoxidation of the rubber is not necessary.

Having thus described our invention, what we claim and desire to protect by Letters Patent is:

1. A thermoplastic, unvulcanized graft copolymer comprising:
    (a) an ethylene-propylene rubbery spine copolymer having graft copolymerized thereon,
    (b) a copolymerizable monomer having at least two ethylenic double bonds, and
    (c) at least one copolymerizable resin-forming monoethylenically unsaturated monomer, the amount of (b) being from 0.01 to 2 parts per 100 parts by weight of (a) and the ratio of (c) to (a) being from 4:1 to 1:4, by weight, produced by a process in which:
    (i) the copolymerizable monomer (b) is first graft copolymerized on (a) in the presence of a free-radical generating polymerization initiator, and
    (ii) the resin-forming monomer (c) is thereafter added to the product of step (i) and graft copolymerized thereon in the presence of a free-radical generating polymerization initiator.

2. A graft copolymer as in claim 1, in which the free-radical generating polymerization initiator is t-butyl peroxypivalate.

3. A graft copolymer as in claim 1 in which (b) is selected from the group consisting of divinylbenzene, tetramethylene diacrylate, glyceryl triacrylate, ethylene dimethacrylate, 1,2,4-trivinylcyclohexane, and tetrallyloxyethane, produced by a process in which:
    (i) the spine copolymer (a) is employed in the form of a latex of said spine copolymer,
    (ii) the copolymerizable monomer (b) is mixed with said latex and a free-radical generating polymerization initiator and the mixture is agitated while heating it whereby a graft copolymer of (b) on (a) is formed, and (iii) thereafter the resin-forming monomer (c) and a free-radical generating polymerization initiator are added to the latex resulting from step (ii) and the mixture is agitated and heated to produce the final graft copolymer.

4. A graft copolymer as in claim 1 in which (a) is a copolymer of ethylene, propylene, and a copolymerizable non-conjugated diene, produced by a method in which:
(i) the spine copolymer (a) is employed in the form of a latex of said spine copolymer,
(ii) the copolymerizable monomer (b) is mixed with said latex and a free-radical generating polymerization initiator and the mixture is agitated while heating it to a temperature of from 30° C. to 95° C. whereby (b) copolymerizes with (a), and
(iii) the resin-forming monomer (c) and a free-radical generating polymerization initiator are thereafter added to the latex resulting from step (ii) and the resulting mixture is agitated while heating it to a temperature of from 30° C. to 95° C. whereby the resin-forming monomer (c) becomes graft copolymerized on the polymer formed in step (ii) to form the final graft copolymer.

5. A graft copolymer as in claim 4, in which (b) is selected from the group consisting of divinylbenzene, tetramethylene diacrylate, glyceryl triacrylate, ethylene dimethacrylate, 1,2,4-tetravinylcyclohexane, and tetrallyloxyethane.

6. A method of making a graft copolymer comprising mixing (a) a latex of a rubbery ethylene-propylene copolymer, (b) a copolymerizable monomer having at least two ethylenic double bonds, and (c) a free radical generating polymerization initiator, agitating the mixture while heating it to a temperature of from 30° C. to 95° C. whereby the said monomer copolymerizes with the said copolymer, thereafter adding to the latex additional different resin-forming monomeric material comprising at least one monoethylenically unsaturated monomer and a free-radical generating polymerization initiator, agitating the mixture while heating it to a temperature of from 30° C. to 95° C. whereby the said resin-forming monomer becomes graft copolymerized on the rubbery copolymer, and thereafter recovering the resulting graft copolymer from the mixture, the ratio of resin-forming material to rubbery copolymer being between 4:1 and 1:4, by weight.

7. A method as in claim 6 in which said rubbery copolymer is an unsaturated copolymer of ethylene, propylene and a copolymerizable nonconjugated diene.

8. A method as in claim 7 in which the copolymerizable nonconjugated diene is dicyclopentadiene.

9. A method as in claim 7 in which the copolymerizable nonconjugated diene is 1,4-hexadiene.

10. A method as in claim 7 in which the copolymerizable nonconjugated diene is methylene norbornylene.

11. A method as in claim 7 in which the copolymerizable monomer (b) is divinylbenzene.

12. A method as in claim 7 in which the resin-forming monomeric material is a mixture of styrene and acrylonitrile.

13. A method as in claim 7 in which the resin-forming monomeric material is styrene.

14. A method as in claim 7 in which the resin-forming monomeric material is a mixture of acrylonitrile and alpha-methyl styrene.

15. A method as in claim 7 in which the resin-forming monomeric material is methyl methacrylate.

16. A method as in claim 7 in which the resin-forming monomeric material is a mixture of styrene and methyl methacrylate.

17. A method of making a graft copolymer comprising mixing a latex of a substantially oxygen-free ethylene-propylene-nonconjugated diene terpolymer rubber, at least one resin-forming monomer, and a free radical generating polymerization initiator, forming an emulsion of the monomer in the latex, heating the mixture under substantially oxygen-free conditions to a temperature at which the initiator decomposes whereby the said resin-forming monomer becomes graft copolymerized on the said rubbery terpolymer, and thereafter recovering the resulting graft copolymer from the mixture, the said terpolymer rubber being gelled prior to the said graft polymerization by copolymerizing the terpolymer rubber with a copolymerizable polyethylenically unsaturated monomer in amount of from 0.01 to 2 parts per 100 parts by weight of the terpolymer rubber.

18. A method as in claim 7 in which the said initiator is t-butyl peroxypivalate.

References Cited

UNITED STATES PATENTS 3,288,739  11/1966  Natta et al.
3,238,275   3/1966  Calvert _____ 260—880

SAMUEL H. BLECH, *Primary Examiner.*

J. T. GOOLKASIAN, *Assistant Examiner.*

U.S. Cl. X.R.

260—876, 29.7